3,309,747
FASTENING DEVICES
William W. Smith, Shelton, Conn., assignor to United Shoe Machinery Corporation, Flemington, N.J., a corporation of New Jersey
Filed Oct. 27, 1964, Ser. No. 406,706
4 Claims. (Cl. 24—208)

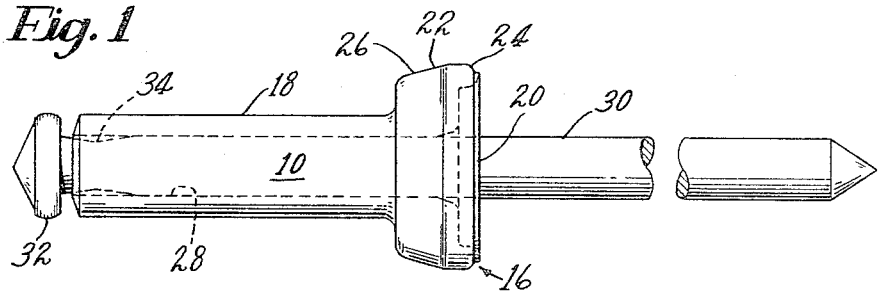
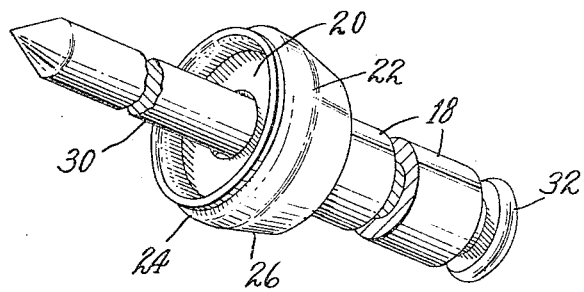
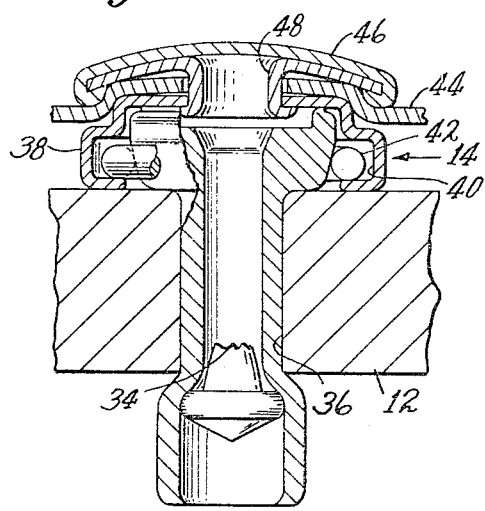
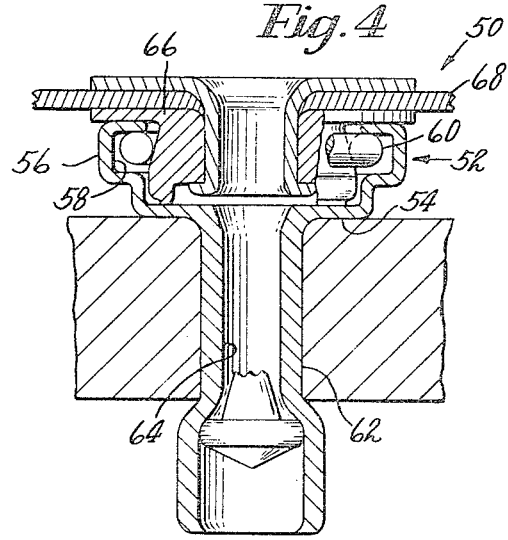

This invention relates generally to fastening devices, and has particular reference to a snap fastener having novel means for attachment to a support panel.

In the manufacture of many articles such as automobiles of the convertible type, it is desirable to provide means for releasably securing a sheet of canvas fabric to a sheet metal panel. Such attachment is customarily made by means of snap fasteners, with one portion, usually the socket, being fastened to the canvas and the mating stud portion being attached to the sheet metal panel or other portion of the auto body.

In most such applications the attachment of the stud to the panel must be made blind, that is, without access to the rear of the panel. Hence the stud is customarily attached by means of a sheet metal screw. This method of attachment has some disadvantage such as the fact that the screw of such a stud often becomes loose in service, and due to the deformation of the surrounding sheet metal, cannot be adequately tightened, and the fact that the assembly time is undesirably long for assembly line operations.

An object of this invention is to provide a snap fastener part which avoids the above disadvantage in that it can be rapidly attached to a supporting member during an assembly line operation in such a manner that loosening during service is avoided.

Other objects of the invention will be apparent to one skilled in the art from the following detailed description of a particular embodiment of the invention.

In the drawing:

FIG. 1 is a view in side elevation of a snap fastener stud embodying the features of the invention;

FIG. 2 is a perspective view of the device of FIG. 1;

FIG. 3 is a view in section illustrating the device of FIG. 1 attached to a supporting panel and a snap fastener socket assembled onto the stud; and FIG. 4 is a view in section of a modified form of the invention, in which a snap fastener socket embodying the features of the invention is secured to a support panel, with a snap fastener stud assembled into the socket.

Referring to FIGS. 1–3 of the drawing, there is illustrated a snap fastener stud 10 which is adapted for attachment to a panel 12 to receive a socket 14 in snapping engagement. The stud 10 comprises generally a socket-engaging head portion 16 and a hollow rivet body 18 extending from the rear side of the stud head.

The head 16 comprises a central base portion with a peripheral portion 22 of conventional shape, having a forwardly facing rounded lead-in portion 24 and a rearwardly facing inclined surface 26 to permit engagement with a socket in a manner to appear hereinafter.

In the illustrated embodiment the socket engaging head 16 and the rivet body 18 are integral and may conveniently be formed from a single piece of material, such as aluminum, in conventional heading machinery.

The rivet body 18 has a central aperture 28 which also extends through the base 20 of the head 16.

To provide means for attaching the device to the support panel 12 a rivet-setting mandrel 30 may be disposed in the aperture 28. In the particular embodiment illustrated the mandrel has an enlarged setting head 32 disposed on one end thereof just outside the end of the rivet body, with the other end of the mandrel projecting through the base of the stud head and projects therefrom a distance sufficient to enable it to be grasped by a suitable setting tool.

A reduced neck 34 is provided adjacent the head to provide a fracture position when the rivet is set, as will appear hereinafter.

To secure the stud to the support panel 12, the rivet may be inserted in a preformed panel aperture 36 so that the rear side of the head seats against the face of the panel. The mandrel 30 is then grasped with a suitable tool and pulled while maintaining the base 20 of the head 16 against the panel, so that the setting head 32 of the mandrel pulls up inside the end of the rivet on the far side of the panel, enlarging the rivet body. When the head is prevented from further movement by reason of the jamming effect of the rivet wall as the head 32 approaches the panel, continued pulling of the mandrel causes the neck 34 to fracture so that the head 32 remains in the rivet body and the rest of the mandrel may be removed.

Thereafter the socket 14 may be snapped on the stud head 16 in the usual manner. Sockets of this type are well known in the art, and comprise a housing 38 having an opening in one side to receive the stud and a peripheral recess 40 in the housing 38 adjacent the opening retaining an expansible spring ring 42. The socket may be secured to a supporting sheet 44 of fabric or the like by means of a cap 46 retaining a rivet 48 which is attached to the base of the socket. The dimensions of the spring 42 are such that when the socket and stud are forced together, the spring expands over the stud to grip the inclined surface 26 so that the socket is urged snugly against the panel 12.

Referring to FIG. 4, there is illustrated a modified form of snap fastener device embodying the features of the invention, which comprises generally a snap fastener socket 50 which is adapted for attachment to a panel to receive a stud 66 in snapping engagement.

The socket 50 comprises generally a socket portion 52 comprising a base 54 and a peripheral wall 56 having a peripheral recess 58 retaining an expansible spring ring 60. Extending rearwardly from the base 54 of the socket is a rivet body 62, having a central aperture 64 which also extends through the base 54 of the socket.

The rivet 62 may be set by means of a headed mandrel in the manner previously described in connection with the stud 10, so that the socket portion 52 is retained tightly against the face of the panel, to receive the stud 66 which may be attached to a support 68 such as a sheet of fabric, in the conventional manner.

Although in the illustrated embodiment the stud and socket are of the type in which a shouldered stud is grasped by an expansible spring ring in the socket, it will be understood that, for other applications, other types of snap fastener parts may be used. For example the socket may be of the so-called "three-side-lock" type, in which the parts may be disengaged by a separating force applied only at a particular orientation of the assembly.

The stud and socket may also be of the type in which the engagement therebetween is by means of parallel spring wires, or resistent spring fingers, without departing from the scope of the invention. In some instances the devices may be made of drawn sheet metal or injection molded plastic.

Since certain other changes in the device may be made without departing from the scope of the invention, it is intended that all matter contained herein be interpreted in an illustrative and not a limiting sense.

Having thus described my invention, what I claim as new and desire to secure by Letters Patent of the United States is:

1. A snap fastener part, comprising a snap fastener element adapted to being mounted on an accessible surface of a relatively rigid and incompressible support member to receive and engage a mating snap fastener element, blind rivet means including a tubular rivet body formed integrally with and extending rearwardly from the snap fastener element, and means including a frangible mandrel disposed in the rivet body and projecting forwardly from the snap fastener element for setting said rivet by a pull exerted on the mandrel from the accessible side.

2. A snap fastener part adapted for attachment to a relatively rigid and incompressible support panel comprising a base, means disposed about the base for engagement with a cooperating snap fastener part, a hollow rivet extending from the rear side of the base, and a setting mandrel disposed in said hollow rivet, said mandrel having a setting head disposed at the end of the rivet opposite the snap fastener part, the other end of the mandrel extending forwardly from the snap fastener part, said setting head having a diameter substantially the same as that of the rivet, said mandrel having a reduced neck portion positioned a distance from the head less than the length of the rivet.

3. A snap fastener stud, comprising a base and a shouldered peripheral portion adapted for snapping engagement with a mating snap fastener socket adapted for mounting on an accessible surface of a relatively rigid and incompressible support member, said base having an integral hollow rivet extending rearwardly therefrom to project through an opening in a support panel, and a mandrel disposed in said rivet, said mandrel having a setting head on one end disposed at the end of the rivet opposite the base, the other end of the mandrel extending forwardly from the stud through the base of the stud to project an appreciable distance forwardly therefrom, said mandrel having a reduced neck portion disposed forwardly of the setting head.

4. A snap fastener socket adapted for mounting on an accessible surface of a relatively rigid and incompressible support member, comprising a base, a peripheral wall forming a forwardly facing opening to receive a stud, a hollow rivet extending rearwardly from the base, and a setting mandrel disposed in the hollow rivet, said mandrel having a setting head disposed at the end of the rivet opposite the snap fastener part, the other end of the mandrel extending forwardly through the base of the socket to project an appreciable distance forwardly therefrom, said mandrel having a reduced neck portion disposed forwardly of the setting head.

References Cited by the Examiner

UNITED STATES PATENTS

| 359,614 | 3/1887 | Kraetzer | 24—218 |
| 400,865 | 4/1889 | Mandrill | 24—217 |
| 871,897 | 11/1907 | Shipman | 24—216 |
| 1,787,776 | 1/1931 | Carr | 24—219 |
| 1,846,791 | 2/1932 | Carr | 24—214 |
| 2,759,082 | 8/1956 | Rea | 85—72 X |

FOREIGN PATENTS

| 435,446 | 9/1935 | Great Britain. |

WILLIAM FELDMAN, *Primary Examiner.*

E. SIMONSEN, *Assistant Examiner.*